Sept. 29, 1970          R. G. EDGE ET AL          3,531,167
BEARING ASSEMBLY
Filed Jan. 23, 1969                                    3 Sheets-Sheet 1
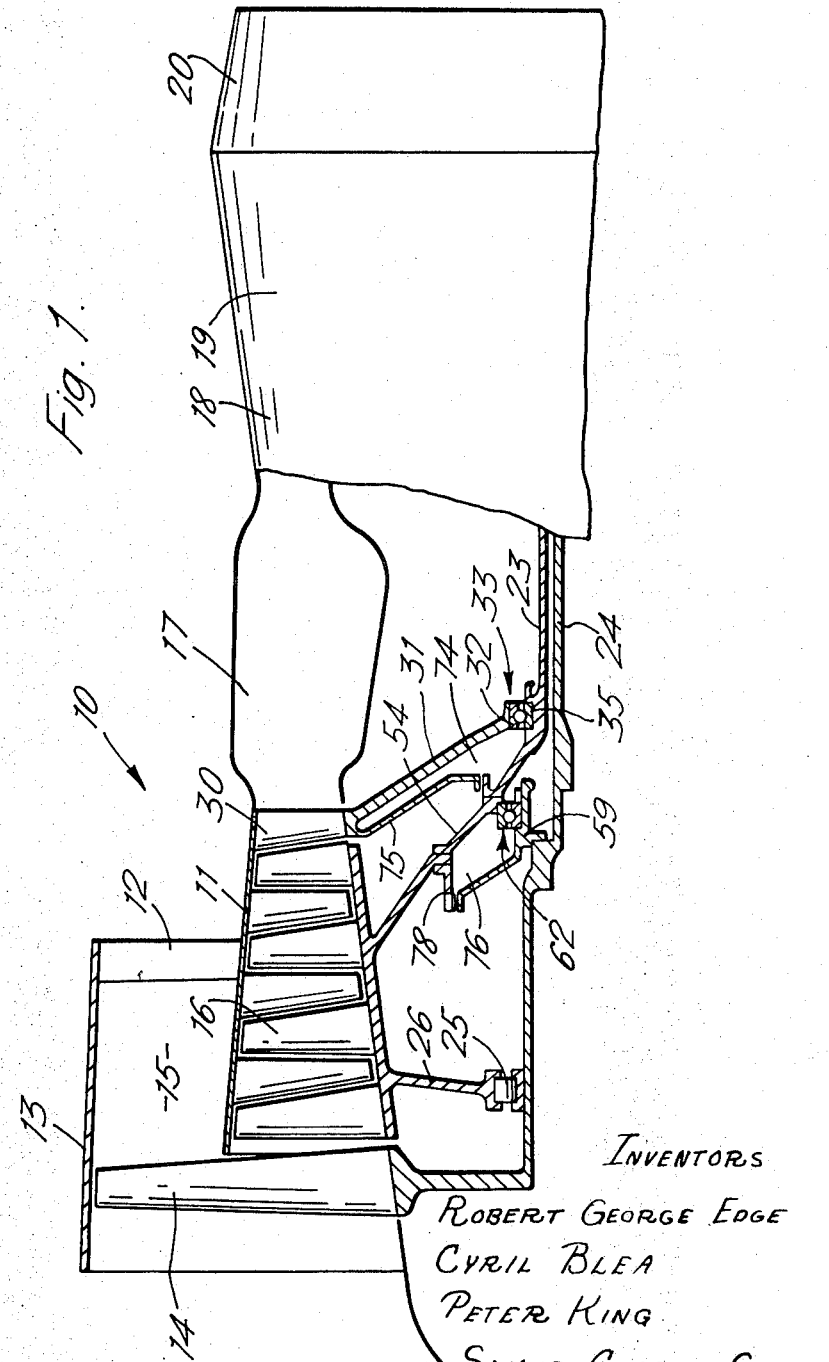
INVENTORS
ROBERT GEORGE EDGE
CYRIL BLEA
PETER KING
SAMUEL CHARLES SMITH
By
Cushman, Darby + Cushman
ATTORNEYS

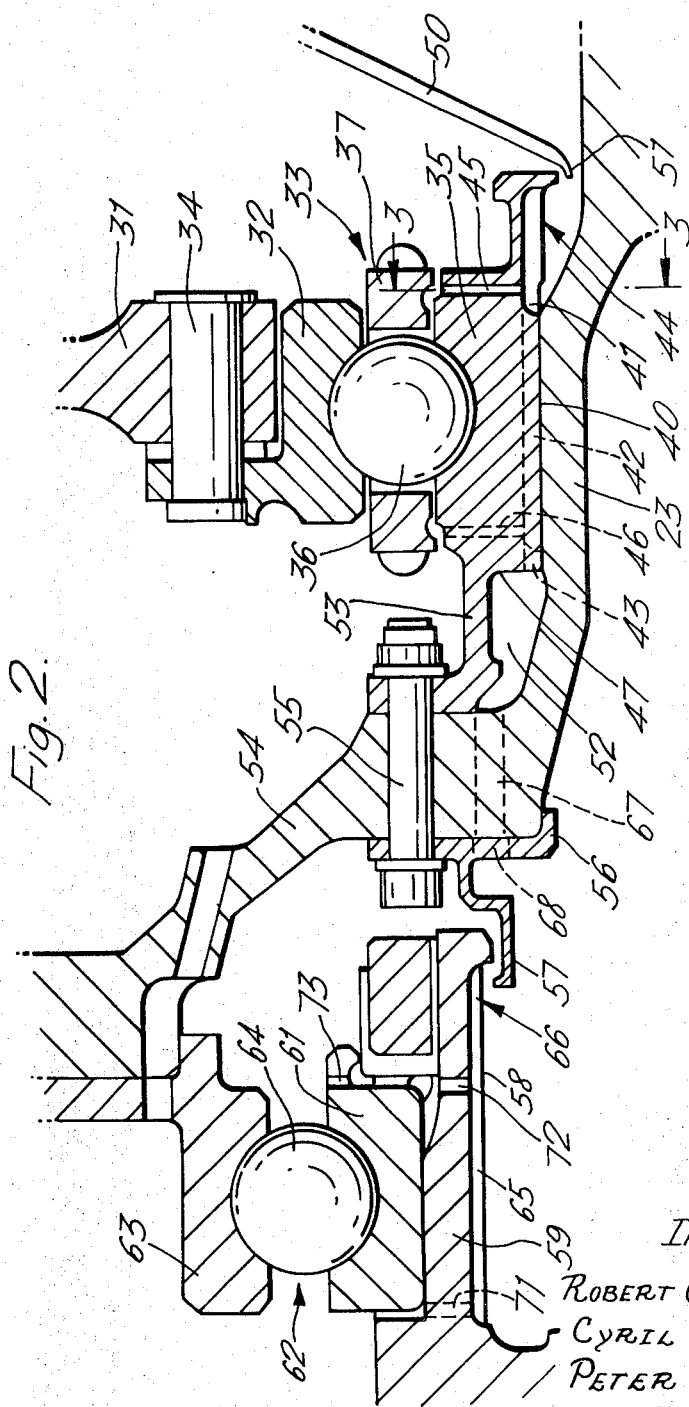

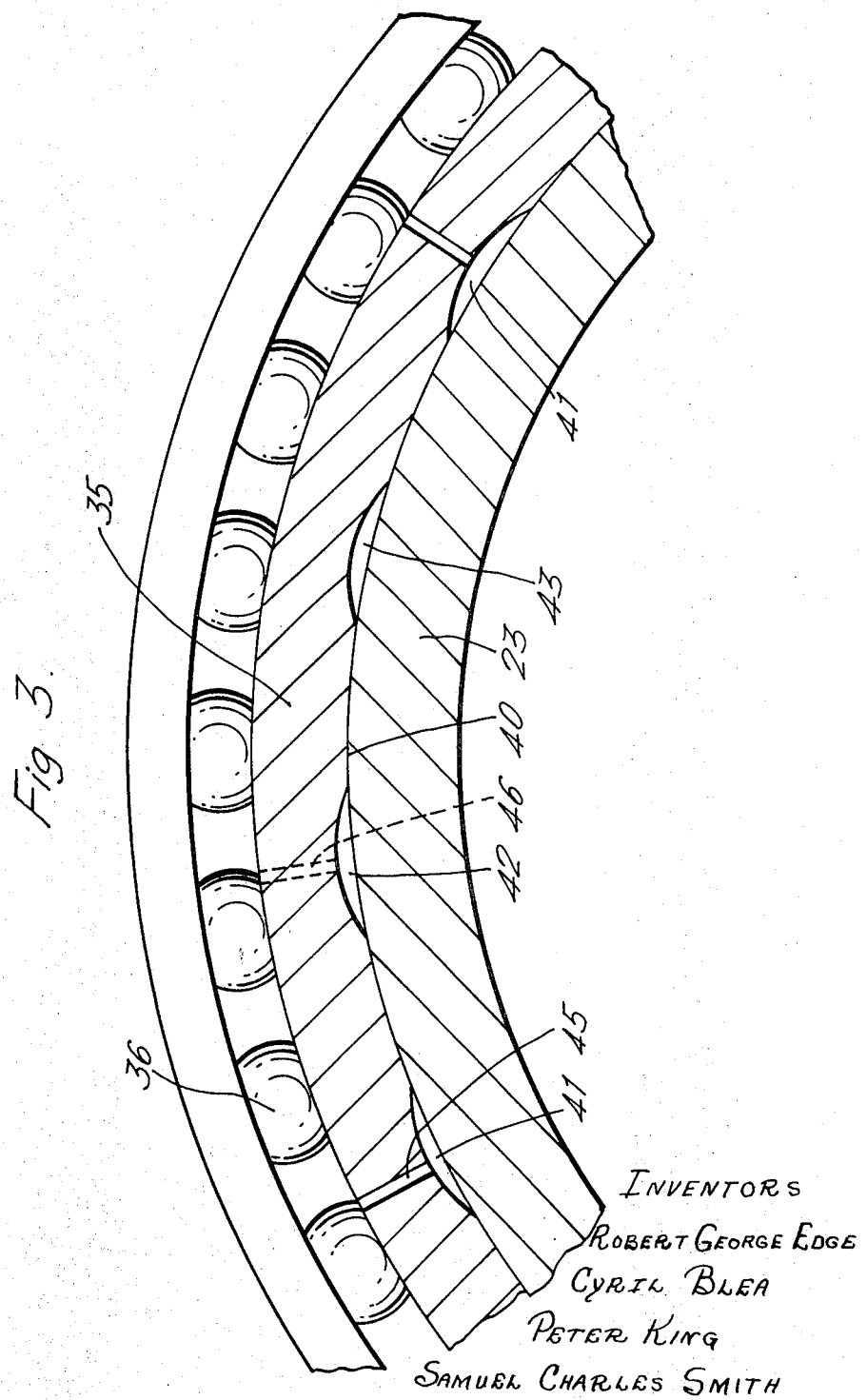

United States Patent Office 3,531,167
Patented Sept. 29, 1970

3,531,167
BEARING ASSEMBLY
Robert George Edge, Cyril Blea, Peter King, and Samuel Charles Smith, Derby, England, assignors to Rolls-Royce Limited, Derby, England, a British company
Filed Jan. 23, 1969, Ser. No. 793,457
Claims priority, application Great Britain, Feb. 6, 1968, 5,828/68
Int. Cl. F16c 1/24
U.S. Cl. 308—187
7 Claims

ABSTRACT OF THE DISCLOSURE

A bearing assembly comprises a bearing having an annular outer race and a rotatable annular inner race which is mounted concentrically within the said outer race and which is spaced therefrom by rolling elements which are in rolling contact with said inner and outer races, the internal surface of the inner race having a plurality of angularly spaced apart, axially extending grooves formed therein, means disposed radially inwardly of the said internal surface for directing lubricant radially outwardly onto a common region of the internal surface with which all the said grooves communicate, and radially extending ducts by means of which some only of the different grooves in operation supply lubricant to the rolling elements from axially spaced opposite sides of the bearing, the said common region being disposed on one said side of the bearing, and the remaining said grooves communicating directly with a lubricant conduit which extends axially from the other side of the bearing.

---

This invention concerns a bearing assembly which may, for example, be employed in a gas turbine engine.

According to the present invention, there is provided a bearing assembly comprising a bearing having an annular outer race and a rotatable annular inner race which is mounted concentrically within the said outer race and which is spaced therefrom by rolling elements which are in rolling contact with said inner and outer races, the internal surface of the inner race having a plurality of angularly spaced apart, axially extending grooves formed therein, means disposed radially inwardly of the said internal surface for directing lubricant radially outwardly onto a common region of the internal surface with which all the said grooves communicate, and radially extending ducts by mean of which some only of the different grooves in operation supply lubricant to the rolling elements from axially spaced opposite sides of the bearing, the said common region being disposed on one said side of the bearing, and the remaining said grooves communicating directly with the lubricant conduit which extends axially from the other side of the bearing.

The term "rolling elements" as used in this specification is intended to include ball bearings, roller bearings, needle bearings and the like.

Each of the said some grooves may, in operation, supply lubricant to the rolling elements from a single side only of the bearing.

Those of the said some grooves which supply lubricant to the said one side may be axially shorter than those which supply lubricant to the said other side.

The said remaining grooves may extend from one side of the inner race to the other side thereof.

There may be a second bearing which is arranged to be supplied with lubricant from the said lubricant conduit.

The internal surface of an inner race of the second bearing (or of a shaft on which the last-mentioned inner race is mounted) may have a plurality of angularly spaced apart axially extending grooves formed therein which respectively communicate, via radially extending ducts, with opposite sides of the second bearing so as to supply lubricant to rolling elements of the second bearing, all the last-mentioned grooves communicating with a common region of the last-mentioned internal surface, which common region is disposed on one side of the second bearing and is arranged to be supplied with lubricant from the said lubricant conduit.

The first-mentioned bearing and the second bearing may be respectively disposed on opposite sides of common shafting.

The invention also comprises a gas turbine engine provided with a bearing assembly as set forth above.

The invention is illustrated, merely by way of example, in the accompanying drawings, in which:

FIG. 1 is a diagrammatic broken-away view, partly in section, of a gas turbine engine provided with a bearing assembly in accordance with the present invention, FIG. 2 is a broken-away sectional view of part of the structure shown in FIG. 1 on a larger scale, and FIG. 3 is a broken-away sectional view taken on the line 3—3 of FIG. 2.

In FIG. 1 there is shown a gas turbine ducted fan engine 10 provided with an engine casing 11. Mounted from the engine casing 11 by means of radially extending struts 12 is an outer shroud or cowling 13 within which there is mounted a single stage fan 14. The engine casing 11 and outer shroud 13 define between them a fan duct 15 through which the air from the fan 14 passes to atmosphere. It will be noted that the struts 12, by means of which the outer shroud 13 is mounted from the engine casing 11, are disposed only on the downstream side of the fan 14, this construction serving to reduce the noise created by the fan 14.

Mounted in flow series within the engine casing 11 are a compressor 16, combustion equipment 17, a high pressure turbine 18 and a low pressure turbine 19, the turbine exhaust gases being directed to atmosphere through an exhaust duct 20.

The high pressure turbine 18 drives the compressor 16 by way of shafting 23. The low pressure turbine 19 drives the fan 14 by way of shafting 24, the shafting 24 being mounted concentrically within and spaced from the shafting 23. The upstream end of the shafting 24 is mounted within a roller bearing 25 which is supported, by way of a substantially radially extending bearing panel 26, from the upstream end of the compressor 16.

The compressor 16 has a row of outlet guide vanes 30 which extend between the engine casing 11 and a substantially radially extending bearing panel 31. The bearing panel 31 is thus supported from the engine casing 11 by way of the outlet guide vanes 30. The bearing panel 31 supports a fixed annular outer race 32 of a location bearing 33 within which the shafting 23 is rotatably mounted, the outer race 32 being bolted to the bearing panel 31 by bolts 34 (FIG. 2).

The bearing 33 has an annular inner race 35 which is mounted concentrically within the outer race 32 and is spaced therefrom by balls 36 which are in rolling contact with the outer and inner races 32, 35 respectively. The balls 36 are retained within a cage 37, which is supported by contact with the inner race 35 and which therefore in effect acts like two plain bearings respectively disposed on opposite sides of the balls 36. Such bearings require lubrication, and the present invention is primarily concerned with a construction for providing this.

As best shown in FIG. 3, the inner race 35 has an internal surface 40 which is provided with groups of angularly spaced apart, axially extending, constant cross-section grooves 41, 42, 43 formed therein. The grooves 41, 42, 43, which are of part-cylindrical shape, are arranged sequentially about the inner race 35 in groups of three.

All the grooves 41, 42, 43 communicate with a common region 44 of the internal surface 40, which common region is disposed on the downstream side of the bearing 33 (i.e. the right hand side as seen in FIGS. 1 and 2).

The grooves 41 communicate with radially extending ducts 45 by means of which lubricant supplied to the grooves 41 may pass to the downstream side of the bearing 33 so as to effect lubrication of the cage 37 and balls 36 from the said downstream side. The grooves 42 communicate with radially extending ducts 46 by means of which lubricant may pass from the grooves 42 to the upstream side of the bearing 33 so that the cage 37 and balls 36 thereof are lubricated from the said upstream side. As will be seen from FIG. 2, the grooves 41, 42 do not extend substantially upstream of the regions in which they communicate with their respective ducts 45, 46. Accordingly, the grooves 41, which supply lubricant to the downstream side of the bearing 33, are axially shorter than the grooves 42 which supply lubricant to the upstream side of the bearing 33. Each of the grooves 41, 42 is thus arranged in operation to supply lubricant to the balls 36 from a single side only of the bearing 33.

Whereas the grooves 41, 42 extend a part only of the way axially through the inner race 35, the grooves 43 extend completely from the common region 44, on the downstream side of the inner race 35, to the upstream side 47 of the inner race 35.

The common region 44 is supplied with lubricant from a lubricant pipe 50, the lubricant pipe 50 having a nozzle 51 which is disposed radially inwardly of the common region 44 so that the lubricant is directed radially outwardly from the nozzle 51 and onto the said common region 44.

As will be appreciated, the lubricant supplied to the common region 44 will not only pass to lubricate opposite sides of the cage 37 and balls 36, but will also effect cooling of the shafting 23.

The grooves 43, which extend to the upstream side 47 of the inner race 35, communicate directly thereat with a lubricant conduit 52 which extends axially from the upstream side 47. The lubricant conduit 52 is defined between the shafting 23 and an axial extension 53 of the inner race 35.

The axial extension 53 is bolted to a substantially radially extending portion 54 of the shafting 23 by bolts 55. The bolts 55 also serve to secure a flanged member 56 to the shafting portion 54, the flanged member 56 being disposed on the side of the shafting portion 54 axially opposite to that of the axial extension 53. The flanged member 56 has an axially extending flange 57 which extends radially inwardly of the internal surface 58 of a stub shaft 59 which is secured to the shafting 24.

Mounted on the stub shaft 59, so as to be rotatable therewith, is an inner race 61 of a location bearing 62. The bearing 62 has a rotatable annular outer race 63 within which the inner race 61 is concentrically mounted and from which it is spaced by balls 64 which are in rolling contact with the inner and outer races 61, 63.

The surface 58 of the stub shaft 59 has a plurality of angularly spaced apart axially extending constant cross-section grooves 65 formed therein, all the grooves 65 communicating with a common region 66 on the downstream side of the stub shaft 59, thence on the downstream side of the bearing 62. Lubricant which has passed through the lubricant conduit 52 may flow through holes 67, 68, in the shafting portion 54 and flanged member 56 respectively, so as to flow to the internal surface of the flange 57. From there the lubricant may pass radially outwardly from the downstream end of the flange 57 and onto the internal surface 58 at the common region 66.

Each of the grooves 65 extends, at its upstream end, to a position slightly upstream of the inner race 61. Alternate grooves 65, however, communicate by way of radially extending ducts 71, 72 respectively with the upstream side of the inner race 61 and with a radially extending duct 73 through the inner race 61 adjacent the downstream side thereof. Accordingly lubricant is supplied through the alternate grooves 65 opposite sides of the bearing 62 so that the lubricant reaches the balls 64 thereof.

Although, for manufacturing convenience, all the grooves 65 are of the same axial length, if desired alternate grooves 65 could extend only to the ducts 72.

As will be appreciated, the upstream end of the high pressure system constituted by the high pressure turbine 18, shafting 23 and compressor 16 is supported directly from the bearing panel 31 via the bearing 33 while the upstream end of the low pressure system constituted by the low pressure turbine 19, shafting 24 and fan 14 is supported from the shafting 23 by way of the bearing 62, the bearings 33, 62 being respectively disposed on opposite sides of the shafting portion 54.

Lubricant which has passed through the bearing 33 flows into a chamber 74 which is defined by the bearing panel 31, the shafting portion 54, and a substantially radially extending wall 75. Lubricant which has passed through the bearing 62 passes into a chamber 76 which is defined between the shafting portion 54, the flanged member 59, and a cylindrical member 78. Scavenge pumps (not shown) are employed to scavenge lubricant which has passed to the chambers 74, 76.

In operation, lubricant is supplied to the lubricant pipe 50 and thus passes via the nozzle 51 to the common region 44 of the internal surface 40 of the inner race 35. The grooves 41, 42, 43 serve to divide this lubricant into three portions, two of which are respectively supplied to the upstream and downstream sides of the bearing 33 and the third of which is supplied to the lubricant conduit 52. The portion which has passed to the lubricant conduit 52 flows through the holes 67, 68, over the internal surface of the flange 57, and thus radially outwardly to the common region 66 of the internal surface 58 of the stub shaft 59. As a result, lubricant is supplied to the grooves 65 and is divided thereby into two equal portions which are supplied to the upstream and downstream sides respectively of the bearing 62.

As will be appreciated, the inner race of the bearing 62, instead of being constituted, as shown, as a separate member 61 mounted on the stub shaft 59, could be integrally connected to the shafting 24, in which case the grooves 65 could be formed in the internal surface of this inner race.

Although the invention is shown as being applied to a gas turbine engine employing two main shafts (i.e. the shaftings 23, 24), it could be applied, if desired, to a three shaft engine, in which case the bearing panel 31 would be disposed between the intermediate pressure compressor and the high pressure compressor thereof.

We claim:

1. A bearing assembly comprising a bearing having an annular outer race and a rotatable annular inner race which is mounted concentriclly within the said outer race and which is spaced therefrom, rolling elements which are disposed between and in rolling contact with said inner and outer races, the internal surface of the inner race having a plurality of angularly spaced apart, axially extending grooves formed therein, means disposed radially inwardly of the said internal surface for directing lubricant radially outwardly onto a common region of the internal surface with which all the said grooves communicate, radially extending ducts by means of which some only of the different grooves in operation supply lubricant to the rolling elements from axially spaced opposite sides of the bearing, the said common region being disposed on one said side of the bearing, and a lubricant conduit which communicates directly with said grooves and which extends axially from the other side of the bearing.

2. A bearing assembly as claimed in claim 1 in which each of the said some grooves in operation supplies lubricant to the rolling elements from a single side only of the bearing.

3. A bearing assembly as claimed in claim 2 in which those of the said some grooves which supply lubricant to the said one side are axially shorter than those which supply lubricant to the said other side.

4. A bearing assembly as claimed in claim 1 in which the said remaining grooves extend from one side of the inner race to the other side thereof.

5. A bearing assembly as claimed in claim 1 in which there is a second bearing which is arranged to be supplied with lubricant from the said lubricant conduit.

6. A bearing assembly as claimed in claim 5 in which the internal surface of an inner race of the second bearing has a plurality of angularly spaced apart axially extending grooves formed therein which respectively communicate, via radially extending ducts, with opposite sides of the second bearing so as to supply lubricant to rolling elements of the second bearing, all the last-mentioned grooves communicating with a common region of the last-mentioned internal surface, which common region is disposed on one side of the second bearing and is arranged to be supplied with lubricant from the said lubricant conduit.

7. A bearing assembly as claimed in claim 5 in which the first-mentioned bearing and the second bearing are respectively disposed on opposite sides of common shafting.

References Cited

UNITED STATES PATENTS 3,269,786   8/1966   Diver et al. _____ 308—187

FRED C. MATTERN, JR., Primary Examiner

F. SUSKO, Assistant Examiner